United States Patent [19]

Henry, Sr. et al.

[11] 4,416,058
[45] Nov. 22, 1983

[54] APPARATUS FOR WINDING COILS AND INSERTING COILS AND WEDGES INTO STATOR CORES

[75] Inventors: John J. Henry, Sr.; Buddy S. Stuckey, both of Fort Wayne, Ind.

[73] Assignee: Essex Group Incorporated, Ft. Wayne, Ind.

[21] Appl. No.: 331,848

[22] Filed: Dec. 17, 1981

[51] Int. Cl.³ .............................................. H02K 15/06
[52] U.S. Cl. ........................................ 29/734; 29/596; 29/736
[58] Field of Search .................. 29/596, 732, 734, 736, 29/564.1; 140/92.1

[56] References Cited

U.S. PATENT DOCUMENTS

| | | | |
|---|---|---|---|
| 3,579,818 | 5/1971 | Arnold et al. | 29/596 |
| 3,985,164 | 10/1976 | Grawcock | 140/92.1 |
| 4,097,989 | 7/1978 | Stanczak, Jr. | 29/734 |

Primary Examiner—Carl E. Hall
Attorney, Agent, or Firm—Stephen E. Revis

[57] ABSTRACT

Apparatus for forming coils of magnet wire and for inserting that magnet wire along the insulating wedges into the core of a stator comprises a transfer tool of circumferentially disposed wedge guides which receives wedges at a wedging station, is wound with coils of magnet wire by a push winding technique at a winding station, and then moves to an insertion station wherein the windings and wedges are pushed into a stator core. The wedge guides are designed to hold the wedges during the winding operation and also to receive the coils being formed as wire is pushed out of a nozzle rotating over the transfer tool. The coils fall by gravity between predetermined pairs of wedge guides. Finger elements are then inserted upwardly through the bore of the transfer tool. An empty stator core is placed on the finger elements, and the formed coils and wedges are pushed from the transfer tool into the stator core.

11 Claims, 14 Drawing Figures

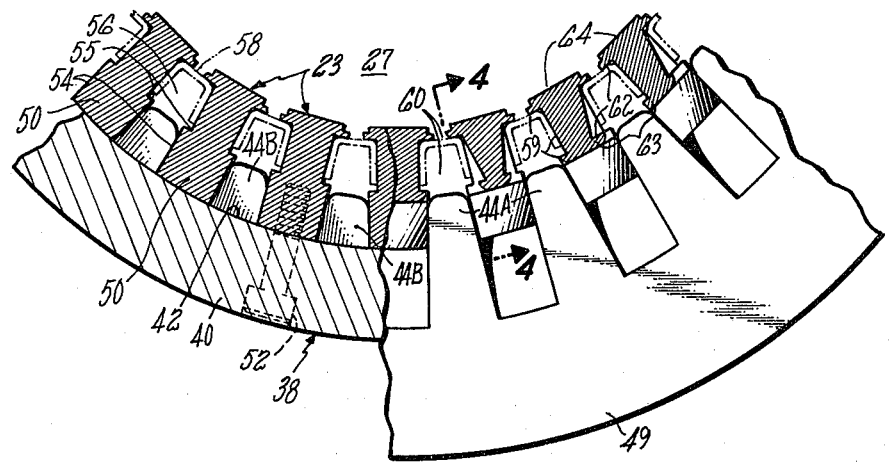
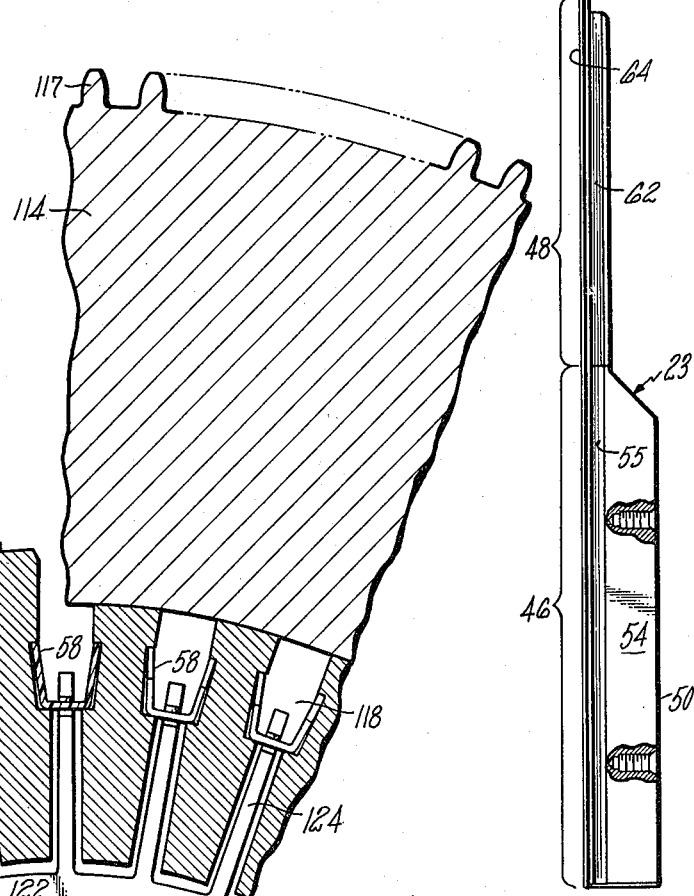

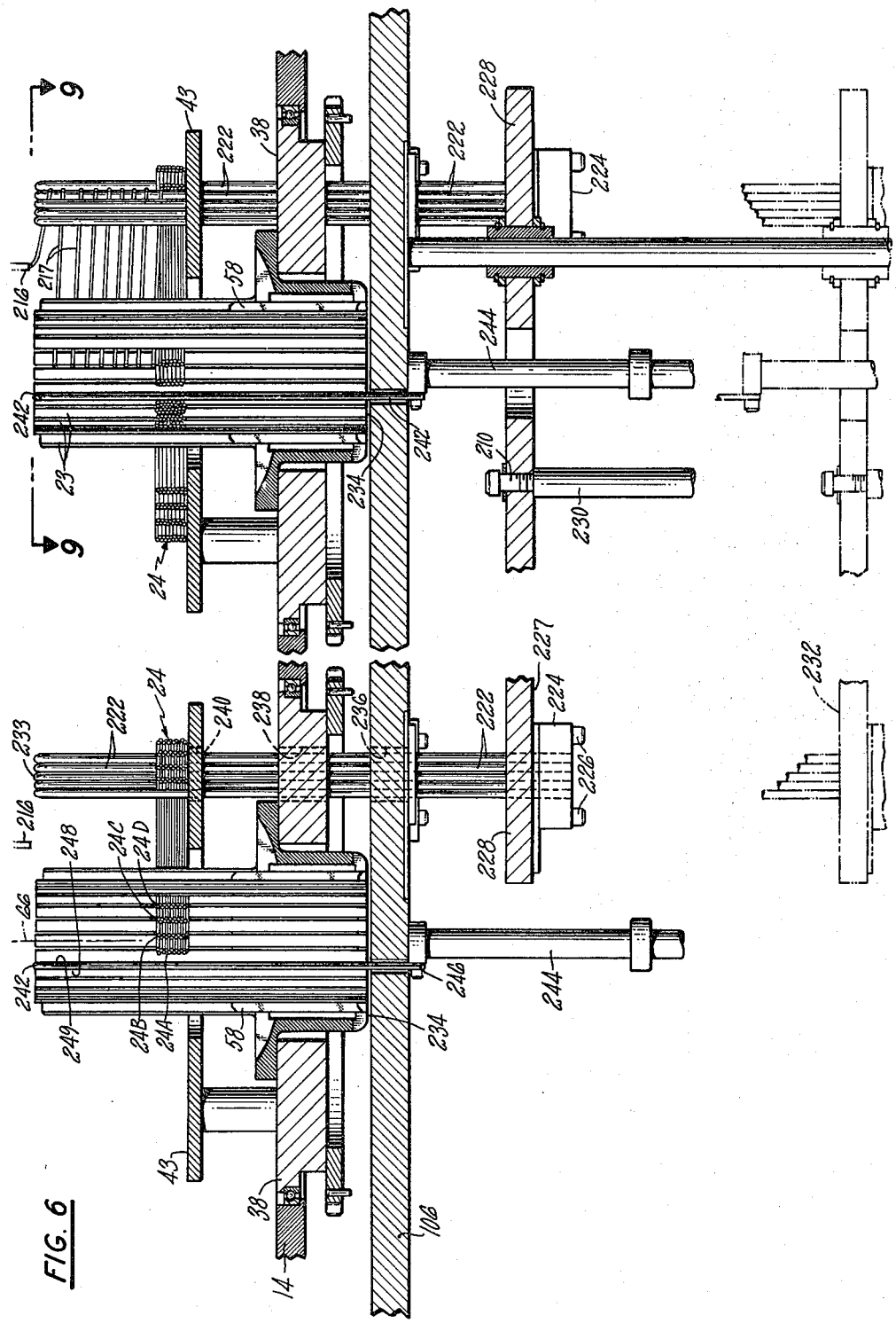

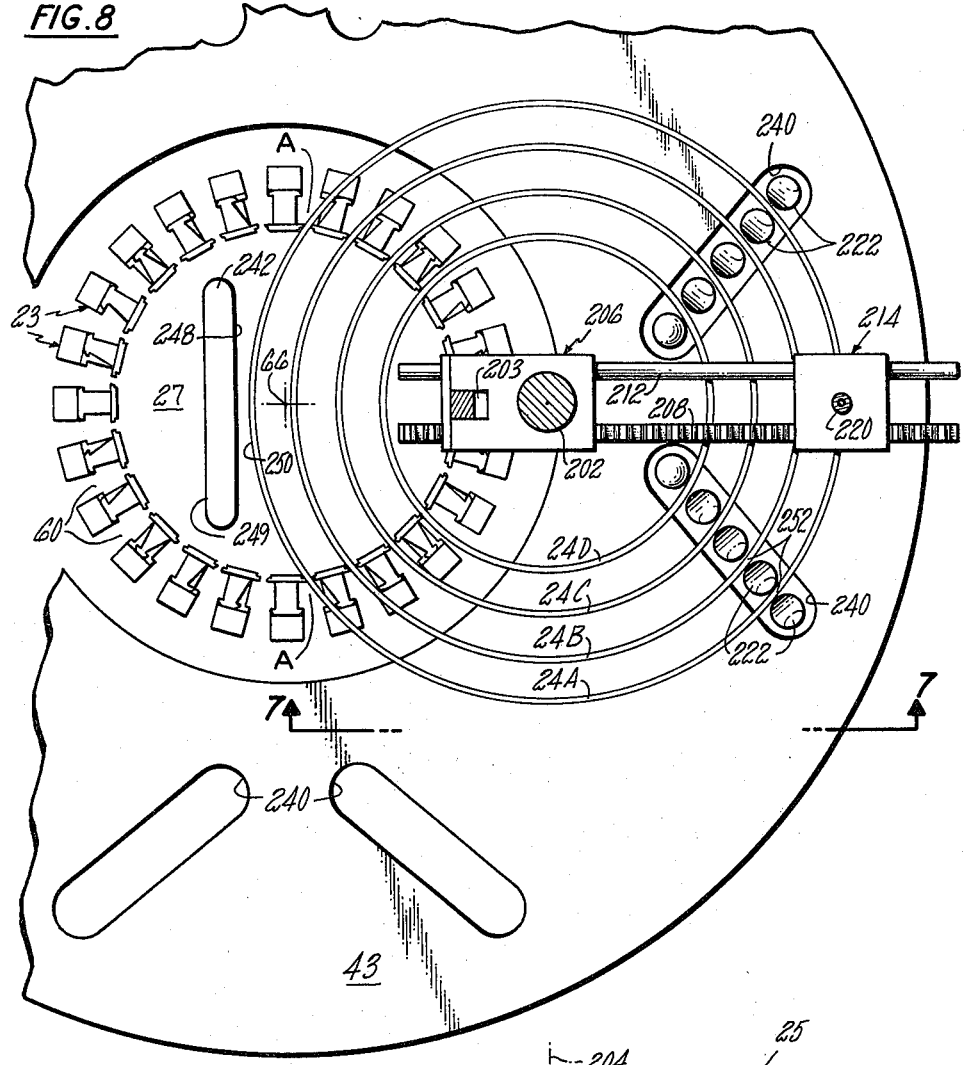
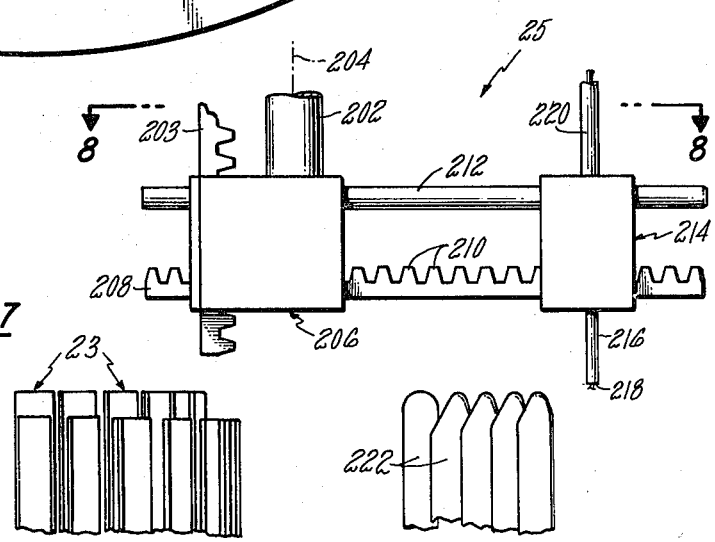

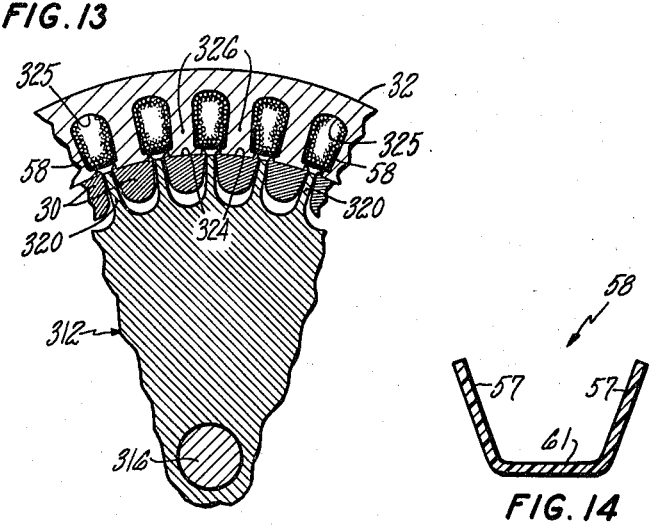
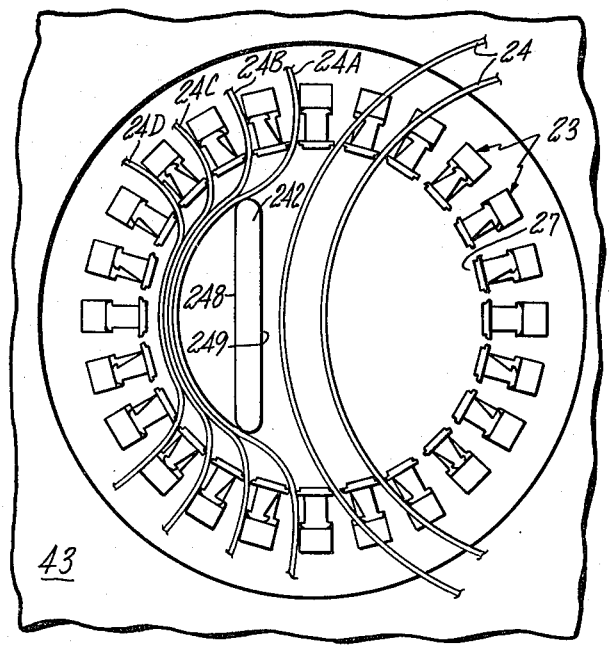

APPARATUS FOR WINDING COILS AND INSERTING COILS AND WEDGES INTO STATOR CORES

DESCRIPTION

TECHNICAL FIELD

This invention relates to machinery for forming dynamoelectric field windings in stator cores.

BACKGROUND ART

Multiple station machinery for forming and inserting dynamoelectric field windings into a stator core are well known in the art. Patents which are representative of this type of apparatus are U.S. Pat. Nos. 3,579,818; 3,691,606; 3,742,596; and 4,106,185. In those patents apparatus is described wherein a transfer tool is moved between stations where various operations take place. For example, in the '818 patent and the '596 patent, insulating wedges are formed at one station and inserted into the wedge guide slots of a transfer tool. The tool is then moved to a second station whereupon dynamoelectric field windings are formed either directly on the transfer tool, as in the '818 patent, or multiple turns are formed into coils initially and then inserted into the slots of the transfer tool, as in the '596 patent.

The winding techniques of the prior art are numerous. Usually the individual turns of wire, as they are formed into a winding or coil, are maintained in tension such as by wrapping them around a plurality of pins as shown in U.S. Pat. No. 3,828,830. U.S. Pat. No. 3,874,424 forms the winding on a template which carries the windings into the transfer tool slots. The windings are then stripped from the template and the template withdrawn from the transfer tool.

With the windings in place on the transfer tool, the transfer tool is then moved to an insertion station whereupon an empty stator core is placed in position on the transfer tool and the windings are stripped from the transfer tool and pushed into the slots of the stator core, along with the wedges. Patents representative of apparatus for stripping windings from a transfer tool and inserting them and wedges simultaneously into the slots of stator cores are U.S. Pat. Nos. 3,324,526; 3,447,225; 3,815,206; and 3,968,556. The wound stator core is then removed from the transfer tool and the transfer tool repeats its cycle through the work stations. A more recent development in this field is the so-called "push winding" method for forming dynamoelectric machine field windings. Representative of this method are commonly owned U.S. Pat. Nos. 3,903,933; 3,985,163; 3,985,164; and 4,033,385. The common feature of the inventions in those patents is that the magnet wire is pushed rather than pulled from the end of a moving or rotating nozzle. The nozzles are appropriately oriented and their path of movement is selected such that gravity coupled with the momentum of the wire being pushed from the nozzle and any deflecting or constraining surface placed in the wire's path will control where the wire falls and the shape which it takes. In the '163 patent concentric circular windings or coils are formed within the slots between blades of a first transfer tool. These prewound coils are subsequently transferred to a second transfer tool which carries wedges between wedge guide blades. The coils are then stripped from the second tool and inserted into the slots of a stator along with the wedges by means well known in the art. It would be advantageous not to have to form the windings on one transfer tool and transfer the windings onto a second, wedge carrying transfer tool from which they are inserted into a stator core. Transfer tools of the prior art which are designed to hold and guide wedges are not suited for winding using the push winding method.

DISCLOSURE OF INVENTION

One object of the present invention is improved apparatus for forming dynamoelectric field windings for insertion into stator core slots.

A further object of the present invention is to form dynamoelectric field windings by the push winding method directly onto a transfer tool which also serves the purpose of guiding wedges and the formed windings into the slots of a stator core.

In accordance with the present invention, winding apparatus includes a transfer tool comprised of circumferentially spaced apart, axially elongated blades which define axially elongated magnet wire receiving spaces as well as wedge guide slots therebetween, said spaces and slots being coextensive; push winding means including a push winding nozzle, the nozzle adapted to rotate above the guide blades in alignment with predetermined pairs of wire receiving spaces as magnet wire is pushed therefrom, the blades being constructed and arranged such that they present no interference to the turns of wire as they fall, under the influence of gravity, from the push winding nozzle into the wire receiving spaces aligned with the nozzle and accumulate to form field windings on the transfer tool.

In accordance with one aspect of the present invention, the apparatus includes means for moving the wound transfer tool to another work station which includes a plurality of axially extending spaced apart finger elements radially aligned one on one with the blades, and which are inserted upwardly through the bore of the transfer tool in contact with the blades, a portion of the finger elements ultimately extending above the tops of the blades. A stator core is disposed on the finger elements with its slots radially aligned with the spaces between finger elements. A stripper and wedge pusher are adapted to move through the bore and push the windings and wedges from the transfer tool into the slots of the stator core.

In accordance with another aspect of the present invention, the apparatus may also include vertically extending, spaced apart guide pins external of the bore of the transfer tool which define wire guide spaces therebetween which are also aligned with the circular paths of the push winding nozzle. The turns of wire, as they fall from the push winding nozzle, fall into these guide spaces as well as between guide blades of the transfer tool. These guide spaces assure that the turns of wire fall in neat, concentric circles as they build up on the transfer tool.

In accordance with yet another aspect of the present invention, an axially elongaged bar is inserted up into the bore of the transfer tool. After windings have been disposed on one half of the transfer tool the transfer tool is indexed 180° and the first windings inside the bore of the transfer tool move around to the other side of the bar. The bar is located such that after rotation the windings are squeezed between it and the inside surface of the transfer tool leaving a major portion of the transfer tool bore free from windings so that the windings disposed on the second half of the transfer tool fall to the same level between the guide blades rather than on top of the first windings formed on the first half of the transfer tool.

In a preferred embodiment the apparatus of the present invention will comprise a wedging station, at least one winding station, and an insertion station; and a transfer tool will be moved sequentially between these stations. At the first station wedges will be formed and inserted into the transfer tool. At the winding station, field windings will be formed by push winding apparatus directly onto the transfer tool. Finally, at the insertion station the windings and the wedges will be pushed from the transfer tool into the slots of a stator core.

BRIEF DESCRIPTION OF THE DRAWINGS

FIG. 3 is a fragmentary cross-sectional view taken generally along the line 3—3 of FIG. 2.

FIG. 4 is a view taken along the line 4—4 of FIG. 3 which shows a wedge guide of the transfer tool in side elevation.

FIG. 5 is a fragmentary cross-sectional view taken along the line 5—5 of FIG. 2.

FIG. 6 is a cross-sectional view taken generally along the line 6—6 in FIG. 1 showing transfer tools at the winding station with the windings on each tool being in different stages of completion.

FIG. 7 is a view taken generally along the line 7—7 of FIG. 8 showing a side elevation of the turn forming device disposed over the lefthand transfer tool of FIG. 6.

FIG. 8 is a top view of the turn forming device and transfer tool of FIG. 7 and is taken generally along the line 8—8 in FIG. 7.

FIG. 9 is a top view of the righthand transfer tool of FIG. 6 taken along the line 9—9 in FIG. 6.

FIG. 13 is a fragmentary cross-sectional view taken generally along the line 13—13 in FIG. 12.

FIG. 14 is a cross-sectional view of a wedge in free form (i.e., not compressed).

BEST MODE FOR CARRYING OUT THE INVENTION

Figure 1:
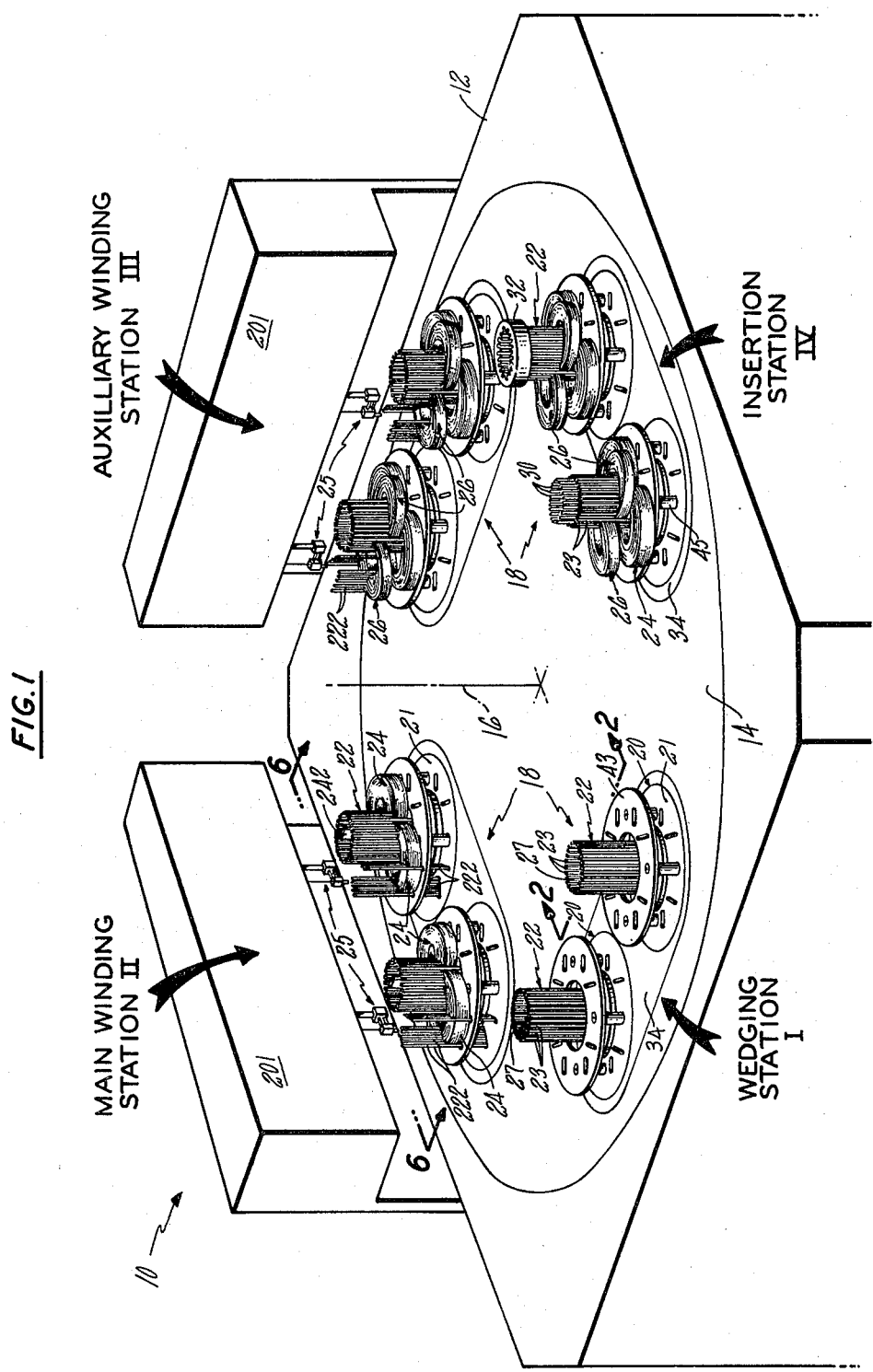
FIG. 1 is a perspective view, partly schematic, showing apparatus in accordance with the teachings of the present invention.

The drawing shows apparatus exemplary of the present invention for automatically forming and inserting dynamoelectric field windings and protective nonconducting (e.g., plastic) wedges into the slots of a stator core. The apparatus is shown partly schematically for ease of explanation.

Referring to FIG. 1, the apparatus of the present invention is generally indicated by the reference numeral 10. The apparatus 10 comprises a frame 12 which supports a transport table 14. The table includes four identical tooling stations 18 and rotates about an axis 16 for carrying the tooling stations sequentially to work stations I, II, III and IV of the apparatus 10. In this embodiment each tooling station 18 comprises a pair of tool nests 20 each of which is shown carrying a transfer tool 22 secured thereto. The transfer tools 22 each comprise a plurality of circumferentially disposed, axially extending wedge guides 23 defining a substantially cylindrical vertically oriented bore 27. The number of tool nests at each station is not considered to be a feature of the present invention and is essentially related to the economies of the operation. The use of two tool nests at each tooling station 18 doubles the output of the apparatus as compared to using a single tool nest at each tooling station.

The operation starts at work station I, the wedge loading station. As will hereinbelow be explained in greater detail, wedges are fabricated and inserted into empty transfer tools 22 located at the wedge loading station I.

Simultaneously with the fabrication and loading of wedges at station I, at work station II a pair of turn forming devices 25 wind main dynamoelectric field windings 24 onto the transfer tools 22, which are already carrying the wedges from station I. Meanwhile, at work station III, auxiliary or second phase field windings 26 are wound onto the transfer tools 22 which have already been through work station I and II. Work stations II and III are hereinafter sometimes referred to as the main and auxiliary winding stations, respectively. Although in this embodiment separate stations are used to wind the main and auxiliary field windings, it is contemplated as being within the scope of the present invention to wind both phases at a single work station. Of course, the auxiliary winding may be deposited at work station II and the main winding at station III. Furthermore, only one winding station is needed for winding the core of a single phase motor.

Work station IV is herein referred to as the inserting station. The transfer tools 22 arrive at the inserting station IV with wedges having already been disposed therein at the wedge loading station I and main and auxiliary field windings disposed thereon from the main and auxiliary winding stations II, III. As will be explained in detail hereinbelow, at the inserting station IV a set of finger elements 30 is automatically inserted into the bore 27 of each transfer tool 22 from below the transport table 14. An empty stator core 32 (only one is shown in FIG. 1) is securely disposed on the finger elements 30, and the field windings 24, 26 and wedges carried by the transfer tools 22 are automatically pushed from the transfer tools 22 into slots of the stator core 32 by means which is essentially known to those skilled in the art and which will be more specifically described hereinbelow. At this point the "wound" stator core 32 is removed from the transfer tools 22 at the inserting station IV and the transport table 14 is rotated or indexed in a clockwise direction to move the tooling stations 18 to the next work station, whereupon each of the above-described operations are repeated.

Figure 2:
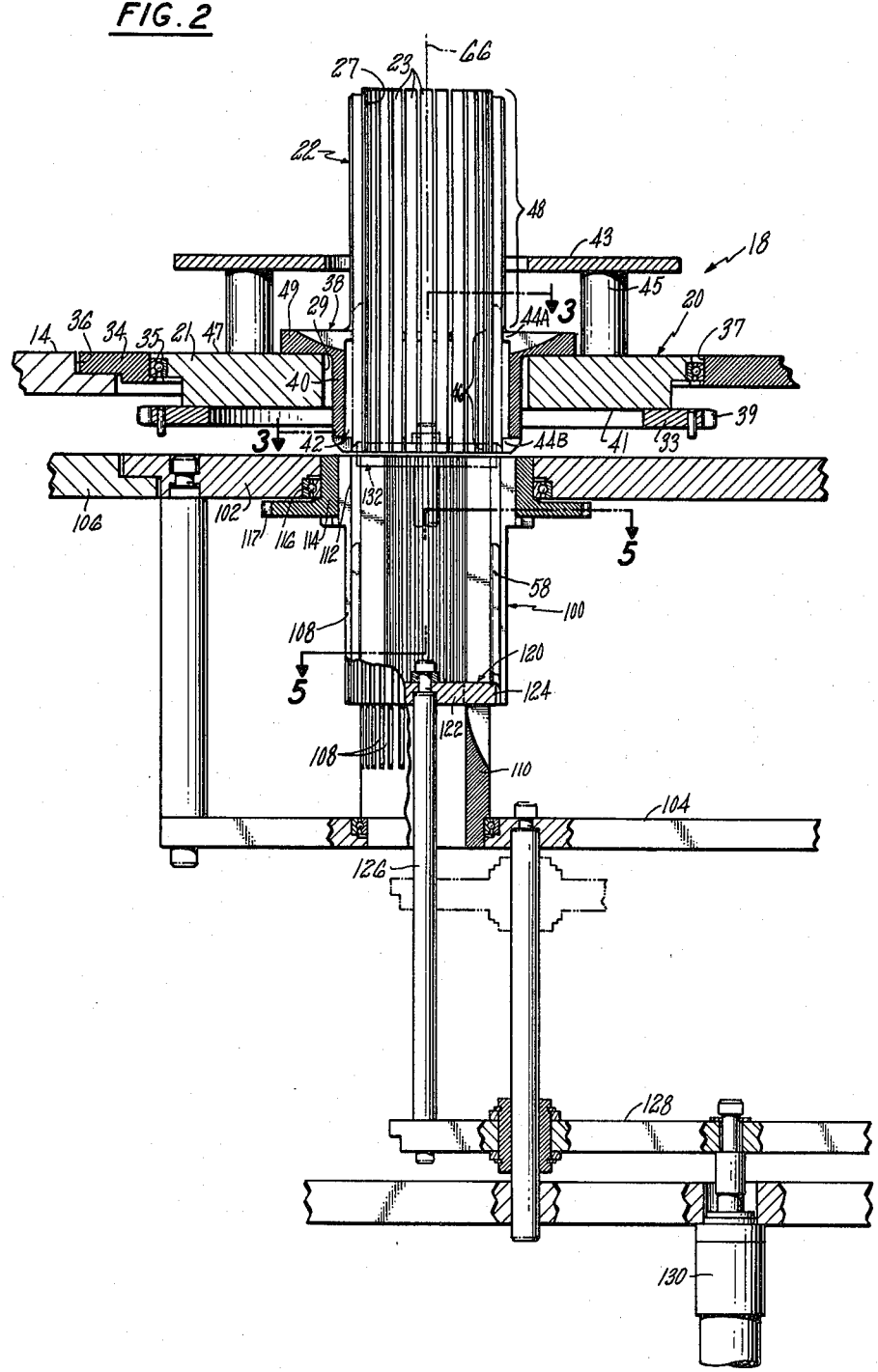
FIG. 2 is a view taken generally along the line 2—2 of FIG. 1 showing a transfer tool at the wedging station.

Having briefly reviewed the operation of the apparatus 10, details of the apparatus and its operation will now be described. Referring first to FIG. 2, a portion of a tooling station 18 is shown at the wedging station I in cross section. Referring to both FIGS. 1 and 2, the tooling station 18 comprises a "figure 8" shaped support plate 34 disposed within a recess 36 in the rotatable transport table 14 of the apparatus 10. The support plate 34 has two circular openings 37 therethrough, within each of which is disposed a tool nest 20, only one of which is shown in FIG. 2. Each tool nest 20 includes an annular tool support ring 21 having a circular opening 29 therethrough. The support ring 21 is rotatably supported by the support plate 34 through bearings 35. A ring 33 of outwardly extending gear teeth 39 is secured to the bottom surface 41 of the support ring 21. A driven mating gear, not shown, engages the gear teeth 39 for indexing the tool nest 20, a procedure which is required at the winding stations II, III, as will be later explained. An annular coil support table 43 is supported by a plurality of pedestals 45 extending upwardly from the top surface 47 of the support ring 21.

The support ring 21 also carries the transfer tool 22, which comprises a wedge guide holder 38 within which are disposed the hereinbefore referred to wedge guides 23. The holder 38 comprises a cylinder 40 extending vertically through the opening 29 in the ring 21. Extending radially outwardly from the top of the cylinder 40 is an annular lip 49 which rests on and is secured to the top surface 47 of the ring 21 by means not shown, such as screws.

As shown in FIGS. 2 and 3, the cylinder 40 has an inner cylindrical surface 42 and radially inwardly extending, circumferentially spaced apart upper and lower tabs 44A, 44B, respectively. Each wedge guide 23, shown in side elevation in FIG. 4, includes a lower wedge holding portion 46 and an upper wedge guide blade portion 48 coextensive therewith. The lower portions 46 of the wedge guides 23 each have a radially outwardly and axially extending attachment block 50 secured by screws 52 against the surface 42 of the holder 38. Each guide 23 is disposed between adjacent pairs of tabs 44A, 44B to assure proper vertical orientation of the guides 23.

The lower portions 46 of each wedge guide 23 also include lower sidewalls 54 defining a pair of oppositely and circumferentially facing, axially extending channels 55. Each channel 55 faces a corresponding channel 55 in the lower portion 46 of the next adjacent wedge guide 23 defining an axially extending wedge holding slot 56 therebetween. Wedges 58 are shown in phantom within the wedge holding slots 56. The wedges are made from a thin, but strong and flexible plastic material. One is shown in cross section in free form in FIG. 14. Note that the legs 57 define obtuse angles with the base 61. The channels 118 of the magazine 100 as well as the wedge holding slots 56 are basically U-shaped in cross section; and the legs 57 of the wedges bend inwardly to conform to that shape.

The upper blade portions 48 of each wedge guide 23 include oppositely facing, axially extending upper sidewalls 59. Each sidewall 59 faces a corresponding sidewall 59 in the upper blade portion 48 of the next adjacent wedge guide 23 defining an axially and radially extending magnet wire receiving space 60 between adjacent wedge guides 23. The wire receiving spaces 60 will be described in more detail in relation to the wire winding operation at the winding stations II, III. The upper sidewalls 59 of each wedge guide 23 also define oppositely facing, axially extending channels 62. Each channel 62 faces a corresponding channel 62 in the upper blade portion 48 of the next adjacent wedge guide 23. Each pair of facing channels 62 defines an axially extending wedge guide slot 63 which is coextensive with the magnet wire receiving space 60. The wedge guide slots 63 are vertically aligned with the wedge holding slots 56. Each wedge guide 23 also has a radially inwardly facing guide surface 64 extending its full axial length. The surfaces 64 define the hereinbefore referred to substantially cylindrical bore 27 of the transfer tool 22. The bore 27 has an axis 66.

Operation of the apparatus 10 at the wedging station I is best described with respect to FIGS. 2 and 5. As shown, disposed below each transfer tool 22 and coaxial therewith is a wedge holding magazine 100, which in these figures is filled with wedges 58. The magazine is basically cylindrical in shape and is supported for rotation about the axis 66 between upper and lower horizontal support plates 102, 104, respectively, which are rigidly secured to a work table 106 which is supported by the frame 12. The magazine 100 includes a plurality of circumferentially spaced fingers 108 extending vertically upwardly from a solid cylindrical base 110. The upper ends 112 of the fingers 108 fit into a sleeve 114 which rotates within bearings 116 in the upper support plate 102. The sleeve 114 includes gear teeth 117 which engage a motorized driving gear (not shown) for rotating the magazine 100. Adjacent fingers 108 define axially elongated channels 118, one each corresponding to and axially aligned with a wedge holding slot 56 in the transfer tool 22. Apparatus for forming the wedges 58 and for inserting wedges 58 one at a time into the channels 118 of the magazine 100 as the magazine is indexed is contemplated as being a part of the apparatus 10 described herein, but is not shown for purposes of simplicity.

A pusher plate 120, having a hub 122 with arms 124 extending radially outwardly therefrom between the fingers 108 of the magazine 100 and under the wedges 58 is attached to a push rod 126 which, in turn, is attached to a carrier plate 128 which may be raised and lowered by an actuator 130 or other suitable means. Raising of the carrier plate 128 results in the pusher plate 120 being moved upwardly through the magazine 100 to the position shown in phantom at 132, whereby the wedges 58 are pushed from the magazine into the wedge holding slots 56 of the transfer tool 22. The pusher plate is then retracted. The tooling station 18 of FIG. 2 is now ready to be moved to the main winding station II by rotating the table 14. The magazine 100 is automatically refilled and the wedge loading operation is repeated for the next set of transfer tools 22. Wedge holding magazines, wedge forming apparatus, and apparatus for inserting wedges into a magazine and for loading a transfer tool with wedges from a magazine are all well known in the art and are not, in and of themselves, considered to be a novel aspect of the present invention. See, for example, U.S. Pat. Nos. 3,742,596 and 3,579,818 which are incorporated herein by reference.

The main winding station II is best described with reference to FIGS. 1 and 6–10. As shown in the perspective view of FIG. 1, disposed over each transfer tool 22 at the winding station II is a turn forming device 25. FIG. 6 is a cross-sectional view taken along the line 6—6 in FIG. 1 which is substantially a plane containing the axis 66 of both transfer tools 22. As depicted in FIG. 1, during operation both transfer tools 22 are wound simultaneously and in identical fashion; but, for purposes of explanation, the winding process at each transfer tool 22 in FIG. 6 is shown in a different stage of completion. The lefthand tool in FIG. 6 is shown in the same stage of completion as the tools 22 in FIG. 1. The righthand tool in FIG. 6 is further along in the winding process. The turn forming device disposed over the lefthand transfer tool 22 of FIG. 6 is shown in the side elevation in FIG. 7.

Turning, first, to FIGS. 7 and 8, each turn forming device 25 comprises a vertical shaft 202 and vertical rack 203, both connected to a wire feeding and control mechanism 201 (FIG. 1). The shaft 202 and rack 203 pass through suitable vertical openings in a guide block 206. Passing horizontally through a suitably shaped opening in the guide block 206 is a rack 208 with upwardly extending teeth 210. Also extending through the block 206 is a horizontal support shaft 212 which is parallel to the rack 208. A nozzle support member 214 is mounted for horizontal movement along the rack 208 and along the horizontal shaft 212. The support member 214 includes a rigid wire dispensing nozzle 216 extending vertically downwardly therefrom. The nozzle 216 has a wire dispensing end 218. The magnet wire is fed into the nozzle support member 214 and to the dispensing nozzle 216 through a flexible tube 220. The tube 220 is connected to the control mechanism 201, which includes wire pushing apparatus. The wire pushing apparatus is not shown herein, but it may be similar to apparatus described in commonly owned U.S. Pat. Nos. 4,033,385 or 3,903,933, which are incorporated herein by reference. During operation the control mechanism 201, via electrical and mechanical systems, not shown, moves the guide block vertically along the shaft 202 and rack 203 to vertically position the wire dispensing nozzle 216, and positions the nozzle support member horizontally along the shaft 212 and rack 208. The axis 204 of the shaft 202 is always positioned outside the bore 27 of the transfer tool 22. The control mechanism 201 rotates the shaft 202 about its axis 204; and thus the nozzle 216 is rotated about the axis 204. Simultaneously magnet wire is pushed from the dispensing end 218 of the nozzle 216.

The control mechanism 201 positions the nozzle support member 214 along the rack 208; and it maintains the position of the support until a desired number of turns have been layed down. As the shaft 202 rotates, the wire being pushed out of the nozzle 216 falls under the force of gravity into the form of circular turns 217 (see FIG. 6, righthand tool 22) having a diameter dependent upon the distance of the nozzle 216 from the axis 204. The mechanism 201 then moves the support to a new position for forming the next winding.

Referring to FIG. 8, the wire feed support 214 is shown in a position which results in the wire dispensing end 218 of the nozzle 216 passing directly in vertical alignment with a pair of wire receiving spaces 60 designated by the letter A. As the nozzle 216 rotates, the wire exiting from the nozzle forms circular turns which fall by gravity into the spaces A. The initial turns come to rest upon the coil support table 43, and subsequent turns fall upon each other, eventually forming a cylinder having a height and thickness determined by the number of turns and the minimum width of the spaces A. The coil support table 43 maintains the cylindrical windings in a substantially horizontal position, which helps keep them from becoming entangled with each other and facilitates inserting the windings into the stator core. Using this apparatus, a winding may be formed on the transfer tool 22 within any predetermined pair of wire receiving spaces 60 by horizontally positioning the shaft 202, moving the nozzle support 214 to a position which will carry the nozzle 216 into alignment with the selected wire receiving spaces, and spinning the shaft 204 while feeding wire through the nozzle 216.

In FIGS. 6 (lefthand tool 22) and 8, four concentric circular field windings 24A, 24B, 24C, and 24D are shown having been formed on one half of the transfer tool 22. To complete the main winding at this station II, a similar set of four concentric windings must be formed on the other half of the tool 22. This requires indexing the tool 22 180° and repeating the above described winding operation. The righthand tool 22 of FIG. 6 has been so rotated and the second set of windings is shown partially completed.

In this embodiment, as seen in FIG. 8, the field winding 24A with the largest diameter surrounds the axis 66 of the transfer tool 22 and thus extends into the left half of the bore 27. If a similar set of windings is to be formed on the left half of the transfer tool 22 in the same manner as they were formed on the right half of the transfer 22, the turns of the largest winding would overlap and thus fall on top of and build up from the top surface of the already existing winding of the same diameter. Subsequently, at the auxiliary station III, additional windings 26 (FIG. 1) will be layed down on the transfer tool 22 90° out of phase with the main windings; and these will necessarily have to lie on top of the main windings. The transfer tools 22 are limited in the cumulative height of the windings which they can accommodate.

To reduce this cumulative height, a tool is provided which eliminates stacking or overlapping of the windings at the main winding station II. This tool is a vertical "squeeze" bar 242 (FIGS. 6, 8, and 9) which is inserted into and retracted from the bore 27 of the transfer tool 22 by a push rod 244 to which it is secured, as at 246. The push rod 244 is operated by hydraulic cylinders or other suitable means, not shown. When fully retracted the bar 242 is below the bottom surface 234 of the transfer tool 22. The bar 242 has a flat front surface 248 which, when inserted into the bore 27, faces and is spaced from the outside surface 250 of the largest diameter field winding 24A (FIG. 8). The axial length of the surface 248 is at least as long as the axial height of the winding 24A. With the bar 242 in place, as the tool nest 20 (and thus the transfer tool 22) is rotated, the windings 24 inside the bore 27 contact and are pushed aside by the bar 242. After 180° of rotation these windings are on the rear side 249 of the bar 242, and they are squeezed or compressed between it and the wedge guides 23, as best shown in FIG. 9. This now leaves room within the bore 27 of the transfer tool 22 for the second half of the windings to fall into the tool 22 to the same level as the windings of the first half. After the main windings are completed, the bar 242 is retracted and the table 14 may be rotated to move the tooling stations 18 to the next work station. It should be evident from the manner in which the bar 242 operates that cross-sectional shapes other than that shown for the bar 242 may be used.

Another problem associated with the winding operation is that the rotating motion of the nozzle 216 imparts some centrifugal force to the magnet wire as it is dispensed therefrom. As a result of this centrifugal force, the wire has a tendency to "fly around" outside the transfer tool 22 and may not fall into neat, coaxial circles unless appropriately constrained. In the present invention the constraint is provided by a plurality of vertically oriented, spaced apart wire guide pins 222 (FIGS. 1, 6, 7, and 8) located outside the bore 27 of the transfer tool 22. These pins are positioned so as to define additional wire guide spaces 252 aligned with the predetermined circular paths of the rotating nozzle 216. As shown in FIG. 6, the lower ends of the pins 222 are secured within a pin holder 224 located below the work table 106 which is supported by the frame 12. The pin holder 224, in turn, is secured by screws 226 to the under side 227 of a vertically movable plate 228. An actuation rod 230 is secured to the plate 228 by a threaded connection at 210. The actuation rod 230 is moved vertically by a hydraulic cylinder or other suitable means, not shown, to raise and lower the plate 228. When the plate 228 is in its lowest position, shown in phantom at 232, the tops 233 of the pins 222 are below the level of the bottom surface 234 of the transfer tool 22. As the plate 228 moves upwardly to position the pins for winding, the pins pass successively through openings 236, 238, and 240 in the work table 106, the tool nest supporting ring 38, and the coil support table 43, respectively. The pins are retracted when it is required to either rotate the table 14 or the supporting ring 38. In this embodiment there are a sufficient number of appropriately located pins 222 such that each turn of wire formed by the nozzle 216 passes through two wire guide spaces 252 outside the transfer tool 22.

Figure 10:
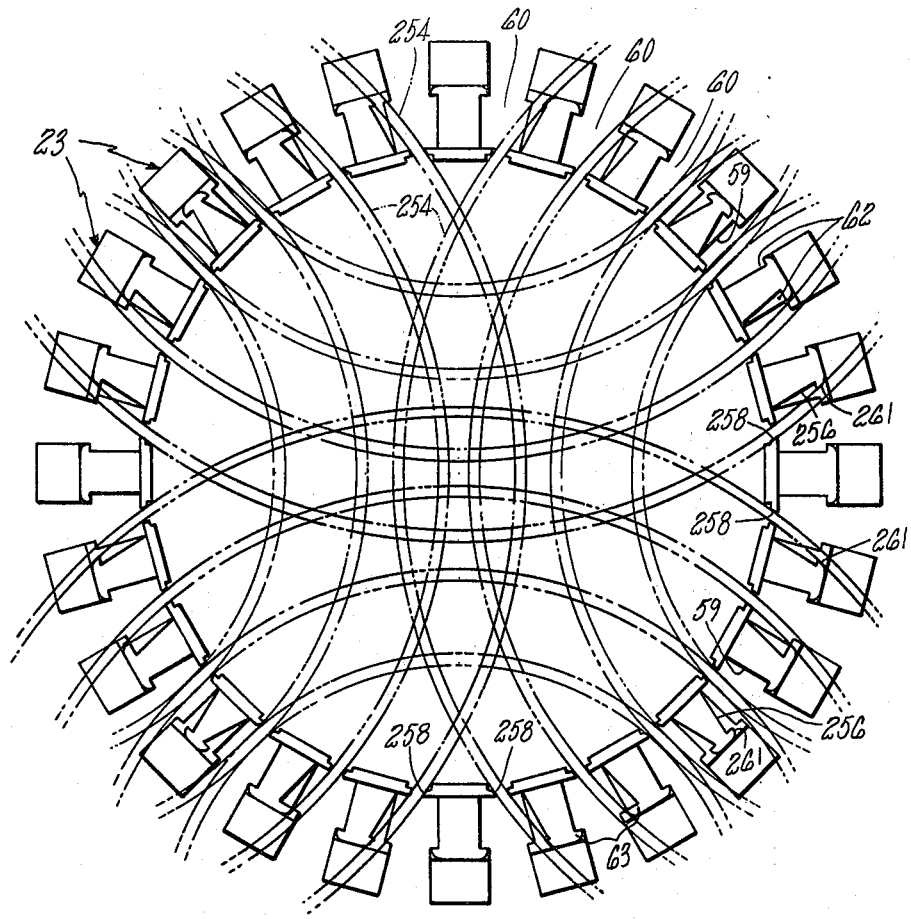
FIG. 10 is a top view of a transfer tool of the present invention with a complete set of main and auxiliary field windings superimposed thereon.

An important aspect of the present invention is the ability to form dynamoelectrid field windings directly onto the same transfer tool used to hold and subsequently guide wedges as well as windings into stator core slots. As described above, this is accomplished by feeding magnet wire vertically downwardly from a nozzle 216 which rotates in circular paths over wire receiving spaces 60 formed between vertical, circumferentially spaced apart wedge guides. It is essential that the turns 217 (FIG. 6) of wire, as they are formed, fall freely into the wire receiving spaces of the transfer tools 22 under the force of gravity and without interference from any portion of the wedge guides. The turns of wire are being formed so fast that if any one turn gets hung up for even a fraction of a second on the tip or edge of one of the guides 23, it could quickly result in a tangle of magnet wire on the transfer tool. Yet, the wedge guides must also be closely spaced and have a shape which defines both wedge holding and wedge guide slots. The problem is compounded because of the different diameters of the turns which must be accommodated by the transfer tools. Thus, turns of different diameters form different angles with respect to the wedge guides 23 between which they must fall. A second phase of windings at 90° to the first phase creates an even greater problem, since some of the wire receiving spaces must receive two wires, each forming a different angle relative to the same wedge guides. Despite these difficulties it has been found possible to modify the shape of otherwise typical wedge guides such that, even for a two phase winding, the turns of wire will fall by gravity into the wire receiving spaces without interference from the wedge guides. This is best shown in FIG. 10 which is a top view of a transfer tool 22 showing only the wedge guides 23. Superimposed on this view, in phantom, are outlines 254 of every winding which is to be formed on the tool. Each outline 254 also represents the approximate path (assuming appropriate indexing of the transfer tool 22) of the dispensing end 218 of the wire dispensing nozzle 216. Each wedge guide blade portion 48 (see also FIG. 2) of each wedge guide 23 is specially shaped to assure that a free and clear vertical space exists between each pair of adjacent guide blade portions along the fall line of each wire which is to pass downwardly therethrough. The wire receiving spaces must also be wide enough to accommodate the desired thickness of the winding which is to be built up therein. Typically the sidewalls 59 of the wedge guide slots 63 are cut back, where necessary, to make room for the winding turns. For purposes of comparison, it might be noted that the wedge guides at the 12, 3, 6 and 9 o'clock positions have a cross-sectional shape which is fairly typical of wedge guides in the prior art. They have only been modified to the extent of cutting chamfers 258 on some of their edges. On the other hand, from FIG. 10 it can be seen that some wedge guides have had the sidewalls of the slots 63 cut back at a moderately sharp angle, as at 256. Also, part of the wedge guide walls forming the legs of the channels 62 have been cut back, as at 261 in FIG. 10. The slots 63 still, however, perform satisfactorily as wedge guide slots since the legs 57 of the wedges (see FIG. 14) spring outwardly against these angled surfaces as the wedges are moved from the holding slots 56 into and thru the guide slots 63.

After the main windings 24 have been formed on the transfer tools 22 at the work station II, the table 14 is indexed to carry these partially wound tools to the auxiliary winding station III, shown in FIG. 1. Upon moving into position at the auxiliary winding station III, the transfer tools 22 are indexed 90°. Guide pins similar to the guide pins 222 used at the main winding station II are inserted upwardly from below the table 14, through appropriately located slots in the support rings 38, and through slots 240 (see FIGS. 6 and 8) in the coil support table 43. Then, using winding apparatus similar to that at the work station II, a set of four concentric auxiliary windings 26 is disposed on one half of each of the transfer tools 22 at 90° to the main windings. The guide pins are retracted; and the transfer tools 22 are indexed another 180°. The pins are reinserted; and the remaining four windings are formed onto the transfer tools 22. The guide pins are once again retracted; and the table 14 is rotated to carry the now fully loaded tools 22 to the inserting station IV.

Figure 11:
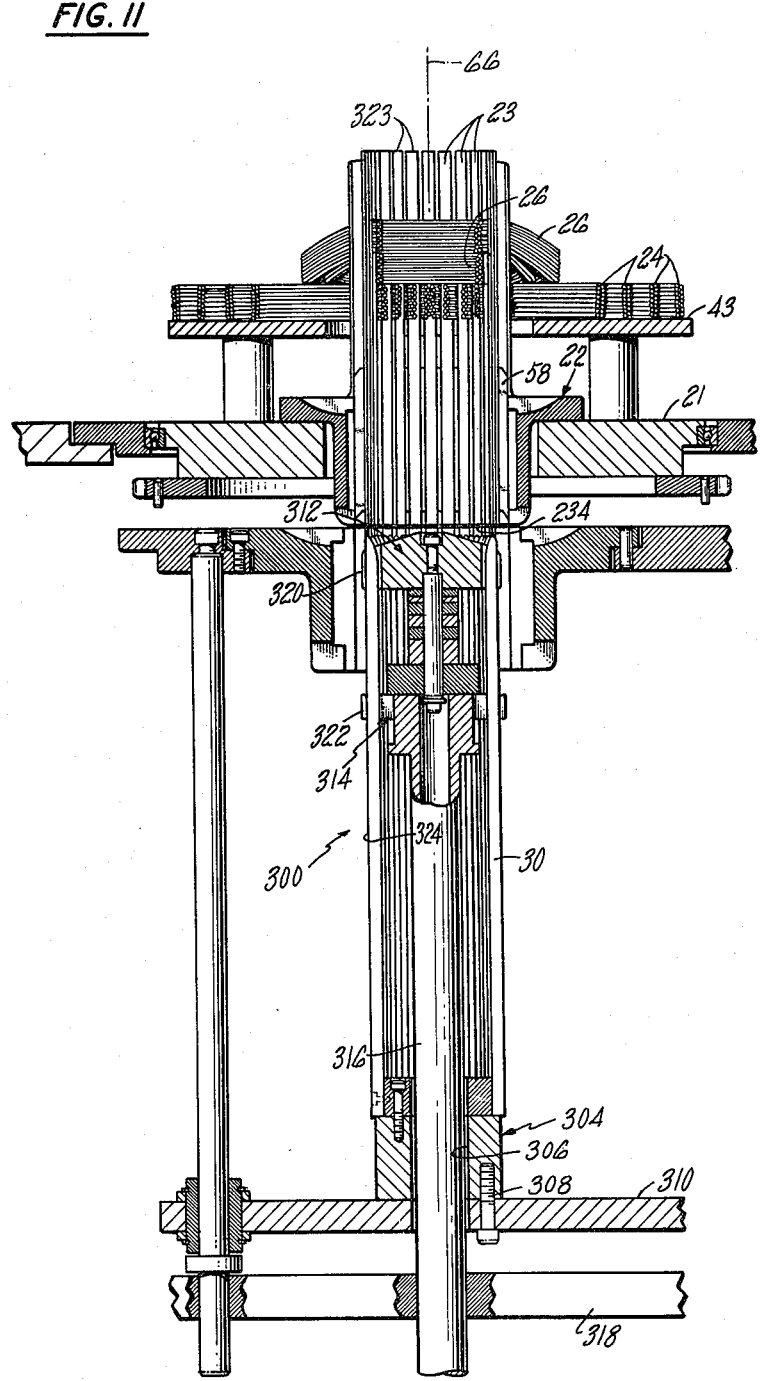
FIG. 11 is a cross-sectional view through a transfer tool disposed at the insertion station of the apparatus of the present invention prior to commencing the inserting operation.
Figure 12:
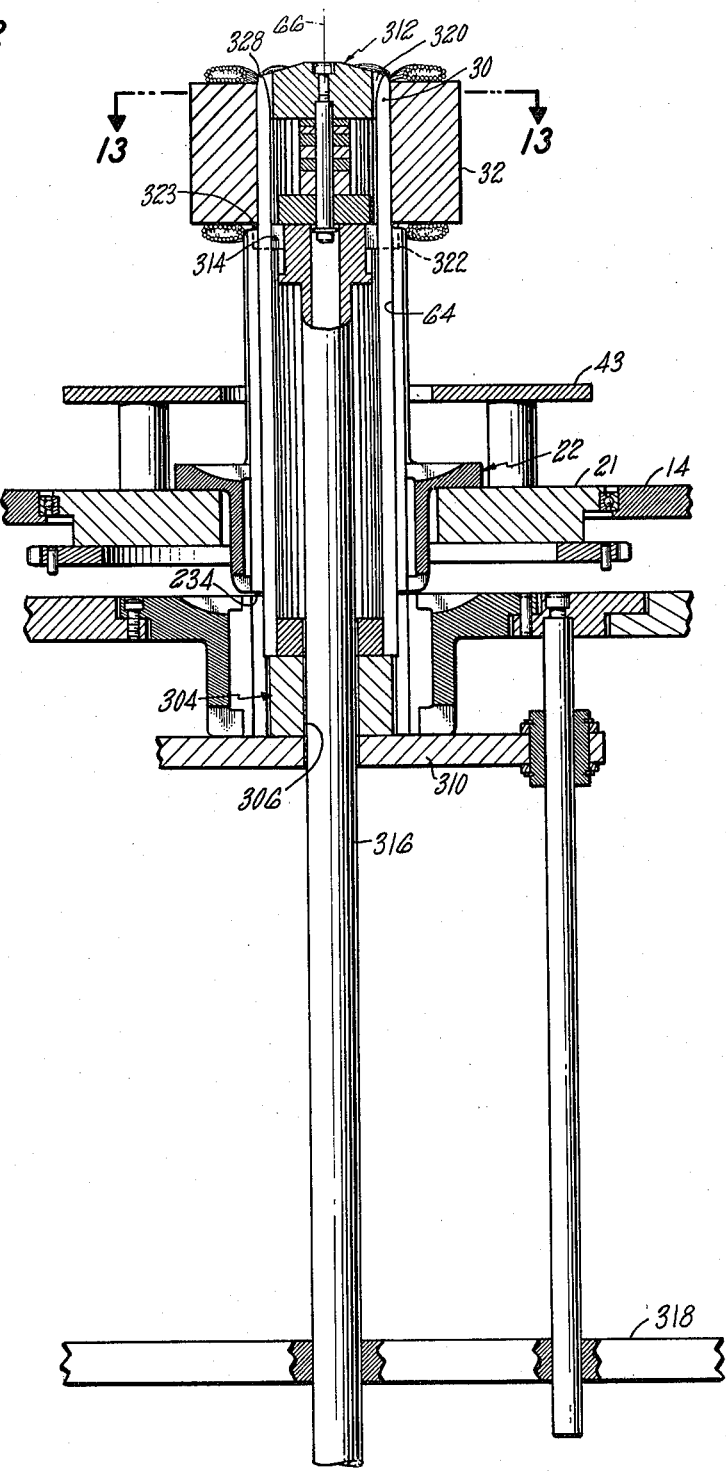
FIG. 12 is a cross-sectional view of a transfer tool disposed at the insertion station of the apparatus of the present invention after the windings and wedges have been inserted into the core and showing the insertion apparatus in its fully extended position.

FIGS. 11 and 12 are cross-sectional views taken generally along a vertical plane through the axes of the two transfer tools 22 at the work station IV and show the apparatus 300 for inserting the wedges and field windings into the stator cores. For purposes of explanation, FIG. 11 shows the inserting apparatus 300 fully retracted; and FIG. 12 shows the inserting apparatus 300 fully extended into the transfer tool 22 and stator core 32. The inserting apparatus of the type shown in FIGS. 11 and 12 is well known in the art, and is similar to that shown in commonly owned U.S. Pat. No. 3,968,556, which is incorporated herein by reference. A brief description, however, is set forth hereinbelow.

Referring to FIG. 11, the inserting apparatus 300 comprises a set of vertically extending finger elements 30 which are circumferentially disposed about and secured to the outer periphery of a cylindrical finger carrier 304, which has a central bore 306. The carrier 306 is secured by screws 308 to a finger support plate 310 which is vertically movable by any suitable means, not shown. The inserting apparatus 300 also includes a stripper 312 spaced vertically above a wedge inserter 314, both being secured to a shaft 316 which passes upwardly and with clearance through a fixed plate 318 (which is supported by the frame 12), the finger support plate 310, and the bore 306 of the blade carrier 304. The shaft 316 is moved vertically by any suitable actuation means, not shown. The stripper 312 and the wedge inserter 314 includes a plurality of arms 320, 322, respectively, extending radially outwardly between the finger elements 30. These arms are vertically aligned with the wire receiving spaces 60 formed between the wedge guides 23.

The insertion operation begins by first introducing the finger elements 30 into the bore 27 of the transfer tool 22. As they move through the bore 27, the radially outwardly facing surface 324 of each finger element 30 slides along the radially inwardly facing surface 64 of a corresponding wedge guide 23, passing through various windings 24, 26 along the way. At their maximum height, the finger elements 30 extend beyond the tips 323 of the wedge guides 23. A stator core 32 is then disposed on the extended portions of the elements 30 such that each core tooth 326 (FIG. 13) is aligned and in contact with the radially outwardly facing surface 324 of a finger element 30, whereby the spaces between the finger elements 30 are aligned with the slots 325 formed between the teeth 326 of the core. The core slots will thereby be aligned one on one, with the wire receiving spaces 60.

With the core 32 in place, the stripper 312 and wedge inserter 314 are then pushed upwardly through the bore 27 of the transfer tool 22 to the position shown in FIGS. 12 and 13. As the stripper 312 moves through the bore 27 and through the stator core 32 it pushes the windings 24, 26 from the tool 22, over the ends 328 of the finger elements 30 and into the slots 325 of the core, in a manner well known to those skilled in the art. The wedge inserter 314, following closely behind the stripper 312, pushes the wedges 58 from the wedge holding slots 56, along the wedge guide slots 63, and into the slots of the stator core over the windings as they are being inserted therein. The stripper 312 and wedge inserter 314 are then retracted from the transfer tool 22; the wound stator core 32 is removed from the finger elements 30 which are then retracted. The table 14 of the apparatus 10 may now be rotated to move the empty transfer tools 22 to the wedging station I.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. Apparatus for forming dynamoelectric field windings and for inserting the windings into slots between the teeth of a stator core comprising:

transfer tool means comprising wall means defining a tool bore having an axis, said wall means forming a plurality of axially extending wedge holding slots circumferentially spaced about the tool bore axis for temporarily holding wedges for subsequent insertion into a stator core, said wall means also including a plurality of axially extending wedge guide blades circumferentially disposed about the tool bore axis and equal in number to the number of wedge holding slots, each wedge guide blade having a pair of oppositely and circumferentially facing, axially extending channels formed therein, each channel facing a corresponding axially extending channel in the wedge guide blade adjacent thereto, each pair of corresponding facing channels defining a wedge guide slot extending in vertical alignment with one of said wedge holding slots, each pair of adjacent wedge guide blades also defining a vertical wire receiving space therebetween extending the length of said wedge guide blades, said blades each having a base adjacent said wedge holding slots and a tip spaced furthest from said wedge holding slots;

means for inserting wedges into said wedge holding slots;

wire winding means including nozzle means having a wire dispensing end, and means for moving said wire dispensing end in a plane over said guide blade tips in a plurality of concentric circular paths of predetermined radii, said paths having an axis outside said tool bore and parallel to said tool bore axis, said winding means constructed and arranged to push wire from said dispensing end forming multiple circular turns of each of said plurality of predetermined radii, wherein said wedge guide blades are constructed and arranged such that the turns of each different predetermined radii fall by gravity into and down through a different predetermined pair of wire receiving spaces without interference from said wedge guide blades and accumulate to form substantially cylindrical, concentric dynamoelectric field windings on said transfer tool means;

inserter means including a plurality of elongated, axially extending, circumferentially disposed, spaced apart finger elements equal in number to said wedge guide blades, each element having a radially outwardly facing axially extending surface, and means for moving said elements vertically upwardly within said tool bore after the field windings have been formed on said transfer tool means such that each of said elements is aligned with and has its said outwardly facing surface abutting one of said wedge guide blades and the spaces between adjacent finger elements are aligned with the said wire receiving spaces, each of said finger elements including a top portion for extending above said tips of said wedge guide blades and aligning radially with and engaging the teeth of a stator core, said inserter means also including stripper means for moving upwardly within said bore of said transfer tool means and within the bore of a stator core disposed on said finger elements to push said field windings upwardly along the spaces between said guide blades and finger elements and over said top portion of said finger elements into the slots of the stator core, said inserter means also including pusher means for pushing wedges from said wedge holding slots along said wedge guide slots into the stator core slots over field windings as the windings are being inserted into the stator core slots, said means for moving said elements including means for retracting said elements from within said tool bore.

2. The apparatus according to claim 1 wherein each of said circular paths of predetermined radii brings said wire dispensing end into vertical alignment with the wire receiving spaces into which the turns of wire are to fall.

3. The apparatus according to claim 2 including wire guide means defining a plurality of wire guide spaces outside said transfer tool bore extending vertically to approximately the same height as said guide blades, said guide spaces being located such that said wire dispensing end passes in vertical alignment above at least one of said guide spaces for each different circular path, wherein said wire guide means constrains said wire turns to fall as circles having as a center the center of rotation of said dispensing end.

4. The apparatus according to claim 3 wherein said wire guide means is located at said winding station and comprises spaced apart, vertically oriented pins defining said wire guide spaces therebetween.

5. The apparatus according to claim 3 wherein said apparatus includes a wedging work station, a first winding work station, and an inserting work station, said wedging station including said means for pushing wedges into said wedge holding slots, said winding station including said wire winding means and said wire guide means, and said inserting station including said inserter means, said apparatus also including means for moving said transfer tool means sequentially to each of said work stations.

6. The apparatus according to claim 5 including a frame, said wedging station, first winding station, and inserting station being secured to said frame, wherein said means for moving said transfer tool means sequentially to each of said stations comprises a table having a vertical axis, said table being mounted on said frame for rotation about said table axis, said table including a plurality of tooling stations circumferentially spaced about said table axis, each of said tooling stations including at least one of said transfer tool means secured thereto, wherein rotation of said table results in said transfer tool means moving sequentially to each of said work stations.

7. The apparatus according to claims 2, 3, 5 or 6 including a tool station, said transfer tool means being secured to said tool station and being rotatable about said tool bore axis, said apparatus also including means for rotating said transfer tool means 180° after forming first windings on a first half of said transfer tool means, said apparatus including vertically extending squeeze bar means having a front surface and rear surface, said apparatus also including squeeze bar inserting means adapted to insert said squeeze bar means into said tool bore and to position said bar horizontally such that its front surface is disposed radially outwardly of the largest diameter winding which is to be formed on the first half of said transfer tool means, and said rear surface is spaced from said wedge guides, wherein when said transfer tool means is rotated 180° with the first half of the main winding formed thereon, the formed windings move to a position between the squeeze bar means rear surface and the said wedge guide blades.

8. Apparatus for forming dynamoelectric field windings directly onto a transfer tool comprising:
transfer tool means comprising a holder and a plurality of wedge guides, said holder including a bore having an axis, said wedge guides being circumferentially disposed about said bore axis and secured to said holder, adjacent wedge guides defining axially extending wedge guide slots therebetween, each of said wedge guides including an axially extending radially inwardly facing surface, said inwardly facing surfaces defining a transfer tool bore coaxial with said holder bore, said wedge guides each including an upper blade portion spaced apart from the upper blade portion of the wedge guide adjacent thereto defining an axially and radially extending wire receiving space therebetween coextensive with a wedge guide slot; and
wire winding means including a vertically oriented nozzle disposed above said wedge guide blades and having a wire dispensing end, said winding means including means for moving said wire dispensing end in a plane above said guide blades in a plurality of concentric circular paths of predetermined radii, said paths having an axis outside said wedge guide bore and parallel to said wedge guide bore axis, each of said circular paths of each different predetermined radii being vertically aligned with a different predetermined pair of wire receiving spaces, said winding means also including means for pushing magnet wire through said nozzle and out of said dispensing end as said nozzle moves in said circular paths, wherein said wedge guide blades are constructed and arranged such that the turns of wire which are formed as said nozzle moves in each of said circular paths fall by gravity into and down through the wire receiving spaces with which the said circular path is aligned without interference from said wedge guide blades and accumulate to form substantially cylindrical and concentric dynamoelectric field windings on said transfer tool means.

9. The apparatus according to claim 8 including wire guide means defining a plurality of wire guide spaces outside said transfer tool bore extending vertically to approximately the same height as said guide blades, said guide spaces being located such that each of said concentric circular paths of different radii is in vertical alignment above at least one of said guide spaces, wherein said wire guide means constrains the turns of wire to fall as circles having as a center the axis of said circular paths.

10. The apparatus according to claim 9 wherein said wire guide means is a plurality of spaced apart, vertically oriented pins defining said wire guide spaces therebetween.

11. The apparatus according to claims 8 or 9 including vertically extending squeeze bar means disposed within said wedge guide bore and having a front surface and rear surface, said squeeze bar means being positioned such that its front surface is disposed radially outwardly of the largest diameter of said concentric windings formed on said transfer tool means and said rear surface is spaced from said wedge guides, means for rotating said transfer tool means 180° after forming said first set of concentric windings, wherein when said transfer tool means is rotated 180° the formed windings move to a position between said squeeze bar means rear surface and said wedge guide blades.

* * * * *